BISHOP & STEVELEY.
Horse Power Elevator and Excavator.

No. 45,965.

2 Sheets—Sheet 2.

Patented Jan. 24, 1865.

Witnesses:
E. Breed
Eliza Heacock

Inventors:
Bishop and Steveley
per Daniel Breed Atty

UNITED STATES PATENT OFFICE.

STEPHEN T. BISHOP AND ANDREW STEVELEY, OF FOND DU LAC, WIS.

IMPROVEMENT IN HORSE-POWER ELEVATORS AND EXCAVATORS.

Specification forming part of Letters Patent No. 45,965, dated January 24, 1865.

*To all whom it may concern:*

Be it known that we, STEPHEN T. BISHOP and ANDREW STEVELEY, of Fond du Lac, in the county of Fond du Lac and State of Wisconsin, have invented a new and useful Improvement in Horse-Power Excavators and Elevators; and we do hereby declare that the following is a full and exact description thereof, reference being had to the accompanying drawings, and to the letters of reference marked thereon.

Our invention consists, first, in combining a tread horse-power with an endless-chain excavator and elevator; and, second, in a peculiar construction and arrangement of horse-power excavator and elevator, all embraced in a single machine for grading railroads and for other purposes.

Figure 1:
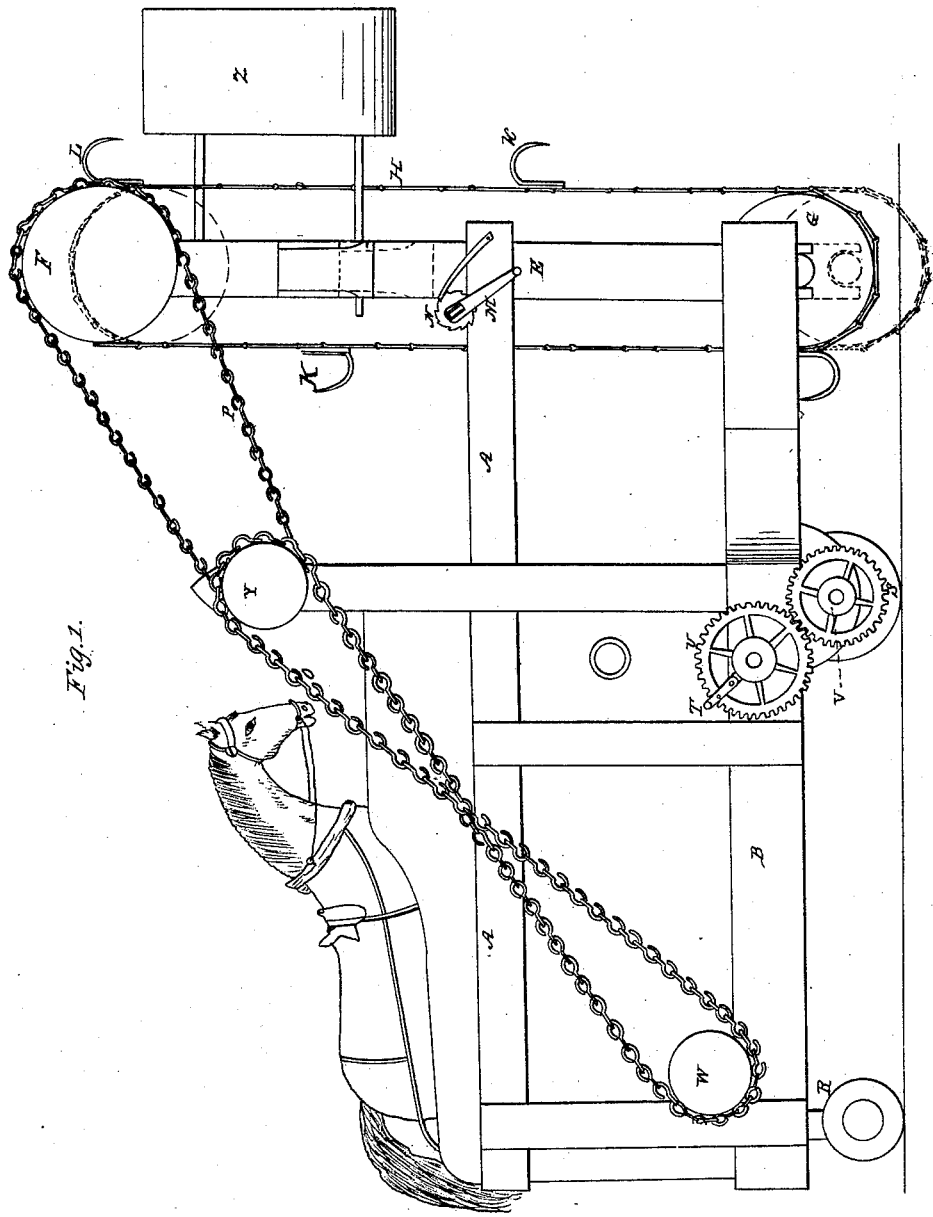
Figure 2:
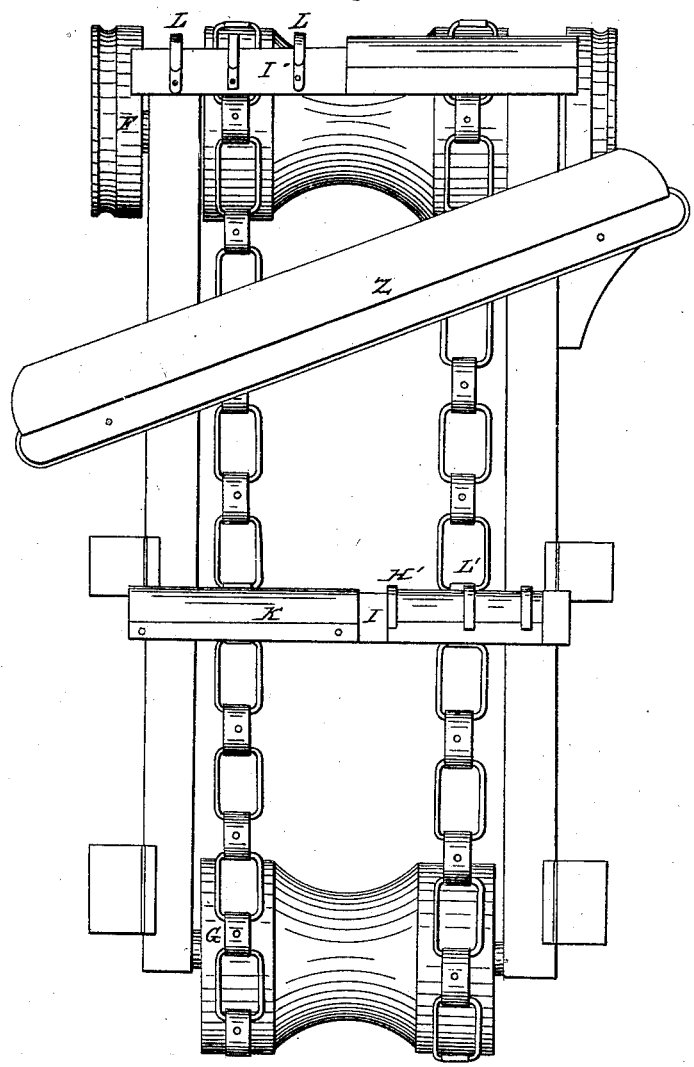

In the accompanying drawings, Figure 1 is a side elevation of our combined horse-power excavator and elevator. Fig. 2 is a front or end view of our machine. In the construction of our machine the horse-power may have any suitable frame and endless apron with the horse working in the usual manner, as seen in Fig. 1 of the accompanying drawings.

The horizontal pieces A and B of the horse-power frame extend forward in order to connect with and support the adjustable frame E of the excavator and elevator. This frame E carries two pulleys, F and G, for supporting and operating the endless chain H. Both of these pulleys work in bearings cut in the ends of the upright pieces of the frame E, so that the lower pulley is loose or held in place by the endless chain H. Upon the chain H are arranged a series of bars, I, to which are attached the buckets K and the hooks L. These buckets extend only half-way across the length of the bar I, while the other half of the bar is provided with hooks or diggers L. The hooks and the buckets are arranged alternately on the bars, (or on the right and the left hand ends of the bars,) as seen in the drawings.

For working in sand, or where less digging than usual is required, a bucket may be fastened upon the hooks, so that the points only of the hooks will dig, as at K' and L', Fig. 2.

The frame E is made adjustable by means of crank M and ratchet-wheel N, in connection with two other ratchet-wheels on the same shaft and two notched or toothed bars attached to the uprights E of the adjustable frame.

The chains O and P, as well as the chain H, may be tightened, if necessary, by any well-known devices.

The entire machine is supported and movable upon wheels R and S. These wheels may be moved by means of the crank T and gear-wheels U and V, and thus the whole machine and the horse are moved forward or backward as the work of excavation and elevation requires.

The operation of our machine is as follows: As the horse travels over the endless apron the pulley W is set in motion. The chain (or band) O transmits motion to the pulley Y, which in turn gives motion to the chain or band P and to the pulley F. Thus the endless chain H is set in motion, and the hooks and buckets excavate and elevate the earth which falls from the buckets upon the discharge-apron Z, Fig. 2.

As the machine is herein represented it is intended for digging on a level with the machine, or below the same. When the machine is to be used to cut away a high bank, the hooks and buckets may be reversed and the chain H driven in the opposite direction, so as to carry the earth up in front of the machine, instead of behind the pulleys F and G, as herein described.

We propose to employ more than one horse and otherwise vary the details of our machine so long as it remains substantially the same.

Having thus fully described our invention, what we claim and desire to secure by Letters Patents of the United States, is—

1. The combination of a tread horse-power with an endless-chain excavator and elevator, substantially as set forth.

2. The adjustable frame E, or its equivalent, in combination with the tread horse-power frame, substantially as specified.

3. The machine constructed and arranged substantially as described.

STEPHEN T. BISHOP.

Witnesses to the signature of Stephen T. Bishop:
DANIEL BREED,
G. BREED.

ANDREW STEVELEY.

Witnesses to the signature of Andrew Steveley:
W. B. KELLOGG,
S. M. IVES.